United States Patent Office 2,920,122
Patented Jan. 5, 1960

2,920,122

DEHYDROHALOGENATION OF HALO-SUBSTITUTED HYDROCARBON

Robert M. Milton, Buffalo, and Donald W. Breck, Tonawanda, N.Y., assignors to Union Carbide Corporation, a corporation of New York No Drawing. Application March 7, 1956
Serial No. 569,963

5 Claims. (Cl. 260—677)

This invention relates to a method of dehydrohalogenation of halo-substituted hydrocarbons.

Isobutene, and similar unsaturated hydrocarbons are useful raw materials for preparing synthetic rubber and other elastomers. Presently these are obtained by cracking petroleum either thermally or over clay catalysts.

It is the object of this invention to provide a novel method of preparation of unsaturated hydrocarbons by dehydrohalogenation of halo-substituted hydrocarbons.

The object is achieved by catalyzing the dehydrohalogenation reaction with activated, synthetic, divalent cation-exchanged sodium zeolite A.

Sodium zeolite A is a crystalline synthetic sodium-aluminum-silicate having a composition expressed in terms of oxides as follows:

$1.0 \pm 0.2$ $Na_2O:Al_2O_3:1.85 \pm 0.5$ $SiO_2:YH_2O$ wherein "Y" may be any value up to about 5.

Divalent cation-exchanged sodium zeolite A has been produced by preparing a sodium-aluminum-silicate water mixture whose composition, expressed as mixtures of the oxides, falls within either of the following ranges:

|  | Range 1 | Range 2 |
|---|---|---|
| $SiO_2/Al_2O_3$ | 0.5–1.3 | 1.3–2.5 |
| $Na_2O/SiO_2$ | 1.0–3.0 | 0.8–3.0 |
| $H_2O/Na_2O$ | 35.0–200 | 35.0–200 | maintaining the mixture at about 100° C. until crystallization; separating the crystals of hydrated sodium-aluminum-silicate from the mother liquor; and bringing the silicate into intimate contact with an aqueous solution of a soluble divalent cation salt.

The invention is hereinafter described with respect to the calcium-exchanged form of sodium zeolite A, calcium zeolite A.

In Table I is X-ray powder diffraction data showing the more significant of the observed interplanar spacing $d$, for a 93 percent exchanged calcium zeolite A. The X-ray patterns indicate a cubic unit cell of about 12.26±0.02A.

TABLE I

| $d$ Value of Reflection in A. | Relative Intensity $100I/I_0$ Where $I_0$ is the Strongest Line |
|---|---|
| 12.24 | 100 |
| 8.66 | 39 |
| 7.08 | 32 |
| 6.12 | 12 |
| 4.08 | 35 |
| 3.696 | 34 |
| 3.398 | 18 |
| 3.276 | 38 |
| 2.972 | 32 |
| 2.741 | 7 |
| 2.614 | 24 |

Slight differences in X-ray lines may be caused by different degrees of hydration or by the presence of impurities.

Calcium zeolite A may be activated by heating in either air, vacuum, or other appropriate gas to a temperature as high as 600° C. so as to effect a loss of the water of hydration. However, an activation temperature of 400° C. has been found more convenient. The dehydration results in a crystal interlaced with channels of molecular dimensions that offer very high surface areas for the adsorption of foreign molecules.

Synthetic calcium zeolite A is further described and claimed in pending application Serial No. 400,388, now U.S. Patent 2,882,243, issued April 14, 1959.

Dehydrohalogenation, employing calcium zeolite A is effected by bringing a halo-substituted hydrocarbon and calcium zeolite A into contact with each other.

The exact technique for bringing the halo-substituted hydrocarbon and calcium zeolite A into intimate contact is dictated by the economics of each particular application. In general, the common methods for contacting solid catalysts and gases or liquids known in the art are satisfactory for the purposes of the invention. For a flow process, gaseous or liquid halo-substituted hydrocarbon is passed through a bed of calcium zeolite A and the product is extracted from the exit stream. For a batch process, a bed of calcium zeolite A is saturated with gaseous or liquid halo-substituted hydrocarbon, and the dehydrohalogenated product distilled off.

In the preferred embodiment of this invention, a bed of activated synthetic zeolite calcium zeolite A is saturated with the halo-substituted hydrocarbon, closed to the atmosphere, and maintained at a temperature in the range of 100 to 150° C., until the desired degree of conversion is obtained.

EXAMPLE

*Dehydrochlorination of tertiary butyl chloride*

$(CH_3)_3CCl \rightarrow (CH_3)_2C=CH_2 + HCl$

Twenty grams of 1/8 in. dia. clay-bonded zeolite calcium zeolite A pellets (71% exchanged with calcium ions) were activated (dehydrated) in a muffle furnace at 400° C., cooled to room temperature and placed in a 1-cm. glass column so as to give a bed 24-cm. high and 1-cm. dia. Tertiary butyl chloride (10 ml.) was trickled down through the zeolite bed. The top and bottom of the column were then closed, and the sealed column stood overnight. The excess tertiary butyl chloride (that not absorbed) was drained off, and the saturated pellets were placed in a horizontal tube furnace connected to a liquid nitrogen-cooled cold trap. At 100° C. an oily liquid distilled off from the pellets and condensed in the cold portion of the tube. HCl and more oily liquid were found in the cold trap.

The oily liquid was analyzed by infrared spectra to be mostly isobutene with some polymeric organic chloride.

What is claimed is:

1. A method for dehydrohalogenating fluid tertiary halogen-substituted hydrocarbons comprising bringing said fluid tertiary halogen-substituted hydrocarbon and activated synthetic calcium zeolite A into contact with each other.

2. A method for dehydrohalogenating fluid tertiary halogen-substituted hydrocarbons comprising saturating a bed of activated synthetic calcium zeolite A with said fluid tertiary halogen-substituted hydrocarbon and maintaining the temperature in the range of 100° C. to 150° C. during the reaction.

3. A method for dehydrohalogenating fluid tertiary halogen-substituted lower hydrocarbons comprising bringing said fluid tertiary halogen-substituted lower hydrocarbon and activated synthetic calcium zeolite A into contact with each other.

4. A method of dehydrohalogenating tertiary butyl halide comprising saturating a bed of activated synthetic calcium zeolite A with said tertiary butyl halide and maintaining the temperature in the range of 100° C. to 150° C. during the reaction.

5. A method of dehydrochlorinating tertiary butyl chloride comprising saturating a bed of activated synthetic calcium zeolite A with said tertiary butyl chloride and maintaining the temperature in the range of 100° C. to 150° C. during the reaction.

References Cited in the file of this patent

UNITED STATES PATENTS

| | | |
|---|---|---|
| 2,277,650 | Cunradi | Mar. 24, 1942 |
| 2,288,580 | Baehr | June 30, 1942 |
| 2,708,210 | Sias | May 10, 1955 |
| 2,813,139 | Hutchings | Nov. 12, 1957 |

FOREIGN PATENTS

| | | |
|---|---|---|
| 694,488 | Great Britain | July 22, 1953 |

OTHER REFERENCES

Angen Chemie, vol. 66, May 1954, pages 241–9.